United States Patent
Watanabe et al.

(10) Patent No.: US 6,710,001 B2
(45) Date of Patent: Mar. 23, 2004

(54) POROUS SINTERED BODY

(75) Inventors: Osamu Watanabe, Aichi (JP); Shuji Kawai, Aichi (JP)

(73) Assignee: Inax Corporation, Tokoname (JP)

( * ) Notice: Subject to any disclaimer, the term of this patent is extended or adjusted under 35 U.S.C. 154(b) by 297 days.

(21) Appl. No.: 09/917,656

(22) Filed: Jul. 31, 2001

(65) Prior Publication Data

US 2002/0037798 A1 Mar. 28, 2002

(30) Foreign Application Priority Data

Aug. 2, 2000 (JP) ........................................ 2000-234637

(51) Int. Cl.⁷ ................................................ C04B 35/00
(52) U.S. Cl. .......................... 501/155; 501/80; 501/39; 501/32; 588/11; 588/256
(58) Field of Search ............................... 501/80, 81, 82, 501/83, 84, 85, 39, 155, 32; 588/11, 256

(56) References Cited

U.S. PATENT DOCUMENTS

| | | | | | |
|---|---|---|---|---|---|
| 6,145,343 | A | * | 11/2000 | Jantzen et al. | 65/134.3 |
| 6,258,994 | B1 | * | 7/2001 | Jantzen et al. | 588/12 |
| 6,444,162 | B1 | * | 9/2002 | Anshits et al. | 264/628 |
| 6,472,579 | B1 | * | 10/2002 | Anshits et al. | 588/11 |
| 6,541,108 | B1 | * | 4/2003 | Hoffmann et al. | 428/312.6 |

FOREIGN PATENT DOCUMENTS

| | | |
|---|---|---|
| JP | 5-58707 | 3/1993 |
| JP | 7-17757 | 1/1995 |

* cited by examiner

*Primary Examiner*—Karl Group
(74) *Attorney, Agent, or Firm*—Kanesaka & Takeuchi

(57) ABSTRACT

A porous sintered body in which the leaching amounts of heavy metals are small and having high availability contains 0.5–15 weight % of $B_2O_3$, preferably contains 20–60 weight % of $Al_2O_3$, 18–60 weight % of $SiO_2$, 1–12 weight % of the sum of $Na_2O$, $K_2O$, $Li_2O$, and $P_2O_5$, 1–30 weight % of the sum of $CaO$, $SrO$, $BaO$, and $MgO$, and 0.5–15 weight % of $B_2O_3$.

20 Claims, No Drawings

POROUS SINTERED BODY

FIELD OF THE INVENTION

The present invention relates to a porous sintered body to be used for pottery, a sound absorber, a filter, a filtration medium, a thermal insulator, a heat insulator, a heat exchange medium, an absorber, a catalyst, a water-retaining medium or the like.

In addition, the present invention relates to a porous sintered body containing various heavy metals contaminated wastes, besides vitreous wastes.

BACKGROUND OF THE INVENTION

For recycling wastes, it is required to prevent leaching of heavy metal contaminants. Various techniques for preventing the leaching such as solidifying the wastes by using cements and sintering the wastes after adding a sintering additive have been proposed.

Japanese Patent No. 2796243 discloses a method of sintering wastes after adding a sintering additive. In this method, 100 parts by weight of furnace ash is mixed with 5–30 parts by weight of an additive which consists of a silicate or mixture of silicate and $Na_2O$ containing material and which has a weight ratio of $(SiO_2+Al_2O_3)/Na_2O$ of 9.0 to 1.0, molded, and sintered.

Japanese patent publication 5-58707A discloses a method of sintering a mixture of wastes and at least one of feldspar, glass powder, bentonite and frit. Japanese patent publication 7-17757A discloses to sinter a mixture of wastes and at least one of fly ash, pumice, obsidian, perlite, shirasn, tuff and waste glass.

However, heavy metals eluate at a high rate from a sintered body sintered according to either of the above conventional methods.

Vitrification is widely employed to solidify wastes such as furnace ash to produce a solidified body with little heavy metals to be leached. According to this vitrification, the solidified body should be a compact body. Such a compact body can not be used in a wider field and, for example, used as a roadbed material.

It is well known that fused slag of furnace ash of municipal solid waste is mixed with ceramics raw material such as clay, and is fired to produce ceramics such as tiles. However, heavy metals are leached at a high rate from the ceramics thus prepared.

OBJECT AND SUMMARY OF THE INVENTION

It is an object of the present invention to provide a porous sintered body from which heavy metals are hard to be leached and which has high safety and high availability.

A porous sintered body of the present invention contains heavy metals and 0.5–15 weight % of $B_2O_3$, wherein the leaching amount of Cd is 0.01 mg/l or less;
the leaching amount of Pb is 0.01 mg/l or less;
the leaching amount of As is 0.01 mg/l or less;
the leaching amount of Se is 0.01 mg/l or less;
the leaching amount of $Cr^{+6}$ is 0.05 mg/l or less
the leaching amount of Cd is 0.01 mg/l or less; and
the leaching amount of total Hg is 0.0005 mg/l or less.

It should be noted that the leaching amounts of heavy metals are measured by the following method according to Environmental Quality Standards (EQS) for soil pollution issued by Japanese Ministry of the Environment. Any one of the above-listed low leaching amounts of the heavy metals meets with the EQS of Japanese Ministry of the Environment.

Method of Measuring Leaching Amounts of Heavy Metals (EQS)

(1) Preparation of sample solution: A sample (gram) and a solvent (hydrochloric acid is added into pure water to make a solvent having hydrogen ion concentration index from 5.8 to 6.3) (milliliter) are mixed at a weight/volume ratio of 10% in such a manner as to form a mixture 500 ml or more.

(2) Leaching: The prepared sample solution is shaken for 6 hours at an ordinary temperature (approximately 20° C.) and an atmospheric pressure (approximately 1 atm) by using a shaker (the shaking ratio is previously set at 200 per minute and the shaking width is previously set from 4 cm to 5 cm).

(3) Preparation of test liquid: The sample solution prepared in (1) and processed in (2) is statically placed on a shelf for 10 minutes to 30 minutes and is then centrifuged at approximately 3,000 revolutions per minutes for 20 minutes. After that, supernatant is took from the sample solution and is filtered by a membrane filter of which pore size is 0.45 μm to collect filtrate. A predetermined amount of the filtrate is accurately measured and took as a test liquid.

(4) Measurement of leaching amounts: the leaching amounts are measured according to the JIS (Japanese Industrial Standard) K 0102.

In the present invention, the porous sintered body preferably contains 20–60 weight % of $Al_2O_3$, 18–60 weight % of $SiO_2$, 1–30 weight % of the sum of CaO, SrO, BaO, and MgO, and 0.5–15 weight % of $B_2O_3$. It is also preferable that it further contains 1–12 weight % of the sum of $Na_2O$, $K_2O$, $Li_2O$, and $P_2O_5$.

$B_2O_3$ cooperates together with $SiO_2$ or the like in the porous sintered body to form a small amount of glass. In this glass, since $B_2O_3$ is in the quadrivalent form i.e. to be $BO_4$, excess charge is generated around $BO_4$. This excess charge captures heavy metals. Therefore, although the sintered body is porous, the leaching of concealed heavy metal can be prevented. $B_2O_3$ prevents the leaching of heavy metals, and also improves chemical durability and water resistance of the resultant sintered body so that the sintered body is suitable for various kinds of porous materials such as a filter, a water-retaining medium, or a ceramic tile. However, when $B_2O_3$ is contained in an amount exceeding the aforementioned range, the $B_2O_3$ may be in the trivalent form i.e. to be $BO_3$ providing poor chemical durability, thus easily allowing the leaching of heavy metals.

For example, the porous sintered body of the present invention is prepared by mixing glass, a ceramic material such as clay to be dehydrated when fired, and a raw material containing $B_2O_3$ to form a mixture in such a manner that chemical components of a resultant sintered body are 20–60 weight % of $Al_2O_3$, 18–60 weight % of $SiO_2$, 1–12 weight % of the sum of $Na_2O$, $K_2O$, $Li_2O$, and $P_2O_5$, 1–30 weight % of the sum of CaO, SrO, BaO, and MgO, and 0.5–15 weight % of $B_2O_3$; molding the mixture; and firing the molded mixture. In this case, it is preferable that the glass contains $B_2O_3$. It is further preferable that the glass has a chemical composition ratio of $B_2O_3/SiO_2$ being 0.01–0.40.

Dehydrated materials of the raw material to be dehydrated due to firing such as clay has excellent high activity so as to easily react with glass during the sintering process, thereby forming crystalline phases of $SiO_2$—$Al_2O_3$—RO wherein RO is at least one selected from a group consisting of $Na_2O$, $K_2O$, CaO, SrO, BaO, and MgO.

The crystallization of $SiO_2$—$Al_2O_3$—RO makes the strength of the sintered body higher than a case where glass in the raw materials still leaves as glass in the sintered body. In addition to the fact that the strength of crystals is higher than that of glass, significant distortion takes place in glass during cooling process after sintering process and microcrak takes place in this glass portion, thus reducing the strength of the sintered body. On the other hand, it is considered that the crystallization of glass significantly reduces such distortion.

A melted glass phase disappears by crystallization of the glass, so that pores of the sintered body is prevented from being packed with melted glass having low viscosity. Since the crystalline phases are relatively uniformly formed to have a size from 0.1 to 10 µm, pores sized in a range from 0.1 to 10 µm are formed between the fine crystals, thereby providing a quality suitable for a separator filter or a water-retaining medium.

The raw material of the sintered body of the invention contains $B_2O_3$ or glass including $B_2O_3$, so that the sintered body contains a small amount of glass including boron in the quadrivalent form i.e. to be $BO_4$, whereby heavy metals are fixed and thus prevented from being leached.

Aluminum hydroxide is also dehydrated by firing. Dehydrated aluminum hydroxide has higher activity than that of clay so as to easily react with glass, whereby heavy metals are leached easily from glass in a sintered body prepared from raw material including aluminum hydroxide. However, when the glass includes aluminum hydroxide together with $B_2O_3$, heavy metals are prevented from being leached from the glass in the sintered body so as to meet with the EQS of Japanese Ministry of the Environment.

DESCRIPTION OF THE PREFERRED EMBODIMENTS

To prepare the porous sintered body of the present invention, glass and a raw material which is dehydrated by firing are mixed, molded, and fired. Examples of the raw material to be dehydrated by firing include clay mineral such as clay, agalmatolite, montmorillonite, sericite, talc, and chlorite; and various hydroxides such as aluminium hydroxide. As the clay, various clays such as kibushi clay, Gairome-clay, fire clay, and stoneware clay may be employed. It should be noted that components other than the above-mentioned materials, for example, minerals including oxide and salt such as carbonate may be added.

Examples of the glass include borosilicate glass such as $Na_2O$—$CaO$—$B_2O_3$—$SiO_2$, $Na_2O$—$Al_2O_3$—$B_2O_3$—$SiO_2$, $CaO$—$B_2O_3$—$Al_2O_3$—$SiO_2$, $Na_2O$—$CaO$—$MgO$—$B_2O_3$—$SiO_2$, $Na_2O$—$CaO$—$BaO$—$B_2O_3$—$SiO_2$, $Na_2O$—$CaO$—$SrO$—$B_2O_3$—$SiO_2$, $CaO$—$BaO$—$B_2O_3$—$SiO_2$, $CaO$—$SrO$—$B_2O_3$—$SiO_2$, $CaO$—$SrO$—$BaO$—$B_2O_3$—$SiO_2$, or $CaO$—$SrO$—$BaO$—$B_2O_3$—$SiO_2$—$Al_2O_3$; glass or frit having such a composition to be used as a window for a building or an automobile; and vitreous wastes including various kinds of fused slag such as municipal solid waste fused slag, sewage sluge fused slag, blast furnace granulated slag, and converter granulated slag and crystallized slag thereof.

As the source of $B_2O_3$, boron compounds such as boric acid, borates, and borax may be employed. However, in case of using a wet mill to mix raw materials, some of the boron compounds may be solved by water because of its water solubility. Therefore, it is preferable to employ the glass or frit including $B_2O_3$. Glass or frit having a chemical ratio of $B_2O_3/SiO_2$ of 0.01–0.40, for example, borosilicate glass, may have an effect of making chemically high durability by itself even without reaction with component such as $SiO_2$ in the porous sintered body, thereby preventing the leaching of heavy metals. As this borosilicate glass, glass having such a composition as that of glass such as liquid crystal glass or glass for FRP may be employed.

In a preferred proportion of the raw materials, the material to be dehydrated by firing is in a range of 25–400 parts by weight, particularly in a range of 100–250 parts by weight, relative to 100 parts by weight of glass. In the preferred proportion, the components of the sintered body are in the following respective ranges. In case of glass not including $B_2O_3$, a raw material including $B_2O_3$ is preferably added in an amount of 0.1–200 parts by weight relative to 100 parts by weight of the glass.

$Al_2O_3$: 20–60 weight %, particularly 29–55 weight %;
$SiO_2$: 18–60 weight %, particularly 24–57 weight %;
$B_2O_3$: 0.5–15 weight %, particularly 1–5 weight %
Sum of CaO, SrO, BaO, and MgO: 1–30 weight %, particularly 5–25 weight %, more preferably 5–20 weight %; and
Flux (sum of $Na_2O$, $K_2O$, $Li_2O$, and $P_2O_5$): 1–12 weight %, particularly 1–8 weight %.

$SiO_2$ exceeding 60 weight % loses the sintering property of raw materials, while $SiO_2$ less than 18 weight % loses the enough strength of the sintered body. $B_2O_3$ less than 0.5 weight % loses the enough effect of preventing the leaching of heavy metals, while $B_2O_3$ exceeding 15 weight % makes the melting point of the glass excessively low so that it is difficult to make the sintered body to be porous. When the sum of CaO, SrO, BaO, and MgO is less than 1 weight %, insufficient crystalline phases should be produced, thus losing the enough strength. When the sum of CaO, SrO, BaO, and MgO exceeds 30 weight %, pores should be clogged. Flux less than 1 weight % loses the enough strength of the sintered body, while flux exceeding 12 weight % clogs pores. Since $Na_2O$ and $K_2O$ in the flux also function as components of crystalline phases, the sum of $Na_2O$ and $K_2O$ is preferably in a range of 2 weight % or more.

The raw materials are ground if necessary, and then mixed and molded. There is no particular limitation for the grinding method, the mixing method, and the molding method. For example, as the molding method, press molding or extrusion molding may be employed. A molding aid such as methyl cellulose may be added for aiding the molding. In case of a humidity control building material, any suitable configuration such as plate-like, block-like, or cylindrical configuration may be employed.

The molded body is dried if necessary, and then fired at a temperature between 700 and 1100° C., preferably between 800 and 1100° C., more preferably between 900 and 1050° C., for 0.3 to 100 hours, preferably 0.5 to 72 hours.

In this manner, the porous sintered body having flexural strength of 8 MPa or more and water absorption of 10–30% can be obtained.

In X-ray diffraction chart of the porous sintered body, it is preferable that a peak of crystal of $SiO_2$—$Al_2O_3$—RO, wherein RO is at least one selected from a group consisting of $Na_2O$, $K_2O$, CaO, SrO, BaO, and MgO, is detected and that a peak of any crystal of $Al_2O_3$ is not substantially detected.

Examples of crystal based on $SiO_2$—$Al_2O_3$—RO include nepheline, carnegieite, anorthite, gehlenite, plagioclase, celsian. In the X-ray chart, a peak of α-quartz and/or mullite contained originally in clay may be sometimes detected.

EXAMPLE 1

30 parts by weight of industrial aluminium hydroxide ($Al(OH)_3$, purity grade of 99.6%), 30 parts by weight of clays (from Seto, Aichi-prefecture, Japan), and 40 parts by weight of borosilicate glass having composition shown in Table 2 were ground and mixed by a ball mill, after that, press-molded into a mold of 100×100×5 mm, and then fired at 1000° C. for 24 hours, thereby producing a porous sintered body.

With regard to the obtained sintered body, the water absorption, the apparent porosity, the flexural strength, and the leaching amounts of heavy metals (Environmental Quality Standards (EQS) for soil pollution issued by Japanese Ministry of the Environment) were measured and the results are shown in Table 1. The composition of the obtained sintered body was measured and shown in Table 3.

It should be noted that the percentage of water absorption is the percentage of 24-hour water absorption.

According to the target levels of leaching of heavy metals based on the EQS of Japanese Ministry of the Environment, the leaching amount of any one of Cd, Pb, As, and Se should be 0.01 mg/l or less, the leaching amount of hexavalent chromium ($Cr^{6+}$) should be 0.05 mg/l or less, and the leaching amount of total mercury (T—Hg) should be 0.0005 mg/l or less.

EXAMPLES 2–4

Comparative Examples 1–7

Respective porous sintered bodies were prepared in the same manner as mentioned above with reference to Example 1, except the kinds of glass materials, proportions of components of raw materials and firing temperature as shown in Table 1. The same measurements were conducted for each example and the results are shown in Table 1 and Table 3.

TABLE 1

| | | Mixing ratio (parts by weight) | | | Firing | Water | | Flexural |
| | | Glass | | | | Temperature | Absorption | Apparent | Strength |
| | | Kind | Ratio | $Al(OH)_3$ | Clay | (° C.) | (%) | Porosity (%) | (MPa) |
|---|---|---|---|---|---|---|---|---|---|
| Example | | | | | | | | | |
| | 1 | Borosilicate Glass | 40 | 30 | 30 | 1000 | 19.9 | 35.7 | 36 |
| | 2 | Borosilicate Glass Municipal Solid Waste Fused Slag | 30 10 | 30 | 30 | 1000 | 18 | 33.1 | 16 |
| | 3 | Borosilicate Glass Glass Powder | 30 10 | 30 | 30 | 1000 | 20 | 35.1 | 16 |
| | 4 | Boric Acid Municipal Solid Waste Fused Slag | 5 35 | 30 | 30 | 850 | 15.8 | 28.7 | 12 |
| Comparative Example | | | | | | | | | |
| | 1 | Glass Powder | 40 | 30 | 30 | 1000 | 19.5 | 33.3 | 22 |
| | 2 | Glass Powder | 10 | 30 | 60 | 1050 | 25.7 | 41.9 | 13 |
| | 3 | Granulated Slag | 40 | 30 | 30 | 1000 | 25.9 | 42.9 | 12 |
| | 4 | Municipal Solid Waste Fused Slag | 40 | 30 | 30 | 900 | 17.1 | 32.4 | 25 |
| | 5 | Borosilicate Glass Municipal Solid Waste Fused Slag | 5 35 | 30 | 30 | 900 | 17.6 | 31.5 | 18 |
| | 6 | Lithium Carbonate Municipal Solid Waste Fused Slag | 5 35 | 30 | 30 | 900 | 13.3 | 22.9 | 25 |
| | 7 | Phosphatic Frit Municipal Solid Waste Fused Slag | 3 35 | 30 | 30 | 900 | 13.6 | 25.2 | 25 |

| | | | Leaching Amount of Heavy Metal (mg/l)*[1] | | | | | |
| | | | Cd | Pb | As | Se | $Cr^{6+}$ | T-Hg |
| | | Kind | (<0.01) | (<0.01) | (<0.01) | (<0.01) | (<0.05) | (<0.0005) |
|---|---|---|---|---|---|---|---|---|
| Example | | | | | | | | |
| | 1 | Borosilicate Glass | <0.01 | <0.008 | <0.006 | <0.004 | <0.04 | <0.0005 |
| | 2 | Borosilicate Glass Municipal Solid Waste Fused Slag | <0.01 | <0.008 | <0.006 | <0.004 | <0.04 | <0.0005 |
| | 3 | Borosilicate Glass Glass Powder | <0.01 | <0.008 | <0.006 | <0.004 | <0.04 | <0.0005 |
| | 4 | Boric Acid Municipal Solid Waste Fused Slag | <0.01 | <0.008 | <0.006 | <0.004 | <0.04 | <0.0005 |
| Comparative Example | | | | | | | | |
| | 1 | Glass Powder | <0.01 | <0.008 | 0.11 | <0.004 | 0.4 | <0.0005 |

TABLE 1-continued

| | | | | | | | |
|---|---|---|---|---|---|---|---|
| 2 | Glass Powder | <0.01 | <0.008 | 0.06 | <0.004 | 0.1 | <0.0005 |
| 3 | Granulated Slag | <0.01 | <0.008 | ND | <0.004 | 0.2 | <0.0005 |
| 4 | Municipal Solid Waste Fused Slag | <0.01 | <0.008 | 0.07 | <0.004 | 2.1 | <0.0005 |
| 5 | Borosilicate Glass Municipal Solid Waste Fused Slag | <0.01 | <0.008 | <0.006 | <0.004 | 0.8 | <0.0005 |
| 6 | Lithium Carbonate Municipal Solid Waste Fused Slag | <0.01 | <0.008 | <0.006 | <0.004 | 3.1 | <0.0005 |
| 7 | Phosphatic Frit Municipal Solid Waste Fused Slag | <0.01 | <0.008 | <0.006 | <0.004 | 0.4 | <0.0005 |

*[1] Values in parentheses are target levels based on the EQS of Japanese Ministry of the Environment "ND" is a shortened form of "Not Detectable".

TABLE 2

| | $SiO_2$ | $Al_2O_3$ | $Fe_2O_3$ | CaO | MgO | $K_2O$ | $Na_2O$ | $TiO_2$ | SrO | BaO | $B_2O_3$ | lg.loss | Cd | Pb | Cr | As | Se |
|---|---|---|---|---|---|---|---|---|---|---|---|---|---|---|---|---|---|
| A Borosilicate Glass | 53.0 | 14.0 | | 4.50 | 1.40 | | 0.20 | | 5.40 | 13.00 | 6.67 | 0.20 | <0.1 | <2 | 1.0 | 1.1 | <0.1 |
| B Glass Powder | 69.0 | 2.2 | | 9.20 | 4.30 | 1.00 | 14.00 | | | | | 0.90 | <0.1 | 6 | <1 | <0.4 | <0.1 |
| C Granulated Slag | 31.0 | 13.0 | 0.30 | 44.00 | 7.40 | 0.30 | 0.20 | 1.20 | | | | −0.90 | <0.1 | <2 | <1 | <0.4 | 0.6 |
| D Municipal Solid Waste Fused Slag | 35.0 | 15.0 | 6.30 | 34.00 | 2.50 | 1.00 | 3.40 | 1.60 | | | | −1.20 | 0.5 | 6.0 | 230.0 | 0.5 | <0.1 |
| E Phosphatic Frit | 0.4 | 23.0 | | 0.20 | | 1.60 | 22.00 | | | | 6.77 | 2.10 | 0.7 | 5.0 | <1 | <0.4 | <0.1 |

Note)
$SiO_2$ through lg.loss are indicated by weight %.
Heavy metals are indicated by ppm.
Any one of B through D does not contain $B_2O_3$.
The frit of "E" further contains 4.26% of $Li_2O$ and 35.00% of $P_2O_5$.

TABLE 3

| | $SiO_2$ | $Al_2O_3$ | $B_2O_3$ | $Na_2O + K_2O + Li_2O + P_2O_5$ | $CaO + SrO + BaO + MgO$ |
|---|---|---|---|---|---|
| Example 1 | 43.0 | 40.0 | 3.1 | 0.9 | 11.5 |
| Example 2 | 40.8 | 40.0 | 2.3 | 1.3 | 12.8 |
| Example 3 | 44.9 | 38.6 | 2.3 | 2.6 | 10.2 |
| Example 4 | 33.2 | 40.3 | 3.3 | 2.6 | 15.3 |
| Comparative Example 1 | 50.6 | 34.6 | 0.0 | 7.8 | 6.5 |
| Comparative Example 2 | 46.6 | 46.2 | 0.0 | 3.4 | 2.0 |
| Comparative Example 3 | 32.6 | 39.3 | 0.0 | 1.0 | 23.9 |
| Comparative Example 4 | 34.4 | 40.2 | 0.0 | 2.8 | 17.0 |
| Comparative Example 5 | 35.5 | 40.1 | 0.4 | 2.5 | 16.3 |
| Comparative Example 6 | 33.6 | 40.7 | 0.0 | 5.0 | 15.4 |
| Comparative Example 7 | 32.5 | 40.7 | 0.4 | 6.2 | 14.9 |

As apparent from the above Examples and Comparative Examples, the present invention can provide porous sintered bodies of which heavy metals, particularly, hexavalent chromium are leached in small amounts and having high water absorption and still having water-retaining property. On the other hand, it is found from Comparative Example 1 that even when only commercial glass powder having 5.1 of weight ratio $(SiO_2+Al_2O_3)/Na_2O$ that is in a range claimed by Japanese Patent No. 2,796,243 is employed, the results do not meet with the EQS of Japanese Ministry of the Environment. It is also found that although the glass powder has little content of heavy metals, the baking of the glass powder together with $Al(OH)_3$ and clay leads to leaching of heavy metals. It is found from Comparative Examples 6, 7 that even when lithium carbonate or phosphatic frit which can be melt at a low temperature is added as a sintering aid, the results do not meet with the EQS of Japanese Ministry of the Environment.

As mentioned above, the present invention can provide a porous sintered body in which any of the leaching amounts of heavy metals meets with the EQS of Japanese Ministry of the Environment, thus having higher safety, and still having high availability.

What is claimed is:

1. A porous sintered body containing 20–60 weight % of $Al_2O_3$, 18–60 weight % of $SiO_2$, 1–30 weight % of a sum of CaO, SrO, BaO, and MgO, and 0.5–15 weight % of $B_2O_3$, wherein
a leaching amount of Cd is 0.01 mg/l or less;
a leaching amount of Pb is 0.01 mg/l or less;
a leaching amount of As is 0.01 mg/l or less;
a leaching amount of Se is 0.01 mg/l or less;
a leaching amount of $Cr^{+6}$ is 0.05 mg/l or less ; and
a leaching amount of total Hg is 0.0005 mg/l or less;
the above amounts being measured according to Environmental Quality Standards (EQS) for soil pollution by Japanese Ministry of the Environment.

2. A porous sintered body according to claim 1, further containing 1–12 weight % of a sum of $Na_2O$, $K_2O$, $Li_2O$, and $P_2O_5$.

3. A porous sintered body according to claim 1, wherein said sintered body is formed by a raw material containing glass and ceramic material to be dehydrated by firing.

4. A porous sintered body according to claim 3, further containing 1–12 weight % of a sum of $Na_2O$, $K_2O$, $Li_2O$, and $P_2O_5$.

5. A porous sintered body according to claim 3, wherein said $B_2O_3$ is included in the raw material.

6. A porous sintered body according to claim 5, further containing 1–12 weight % of a sum of $Na_2O$, $K_2O$, $Li_2O$, and $P_2O_5$.

7. A porous sintered body according to claim 1, wherein said heavy metals are contained in waste materials as the raw material, said raw material including said $B_2O_3$.

8. A porous sintered body according to claim 5, wherein said raw material containing $B_2O_3$ is glass.

9. A porous sintered body according to claim 6, wherein said raw material containing $B_2O_3$ is glass.

10. A porous sintered body according to claim 7, wherein said material containing $B_2O_3$ is glass.

11. A porous sintered body according to claim 3, wherein at least a part of said glass contains $B_2O_3$.

12. A porous sintered body according to claim 4, wherein at least a part of said glass contains $B_2O_3$.

13. A porous sintered body according to claim 5, wherein at least a part of said glass contains $B_2O_3$.

14. A porous sintered body according to claim 6, wherein at least a part of said glass contains $B_2O_3$.

15. A porous sintered body according to claim 3, wherein at least a part of said glass has a chemical composition ratio of $B_2O_3/SiO_2$ being 0.01–0.40.

16. A porous sintered body according to claim 4, wherein at least a part of said glass has a chemical composition ratio of $B_2O_3/SiO_2$ being 0.01–0.40.

17. A porous sintered body according to claim 5, wherein at least a part of said glass has a chemical composition ratio of $B_2O_3/SiO_2$ being 0.01–0.40.

18. A porous sintered body according to claim 6, wherein at least a part of said glass has a chemical composition ratio of $B_2O_3/SiO_2$ being 0.01–0.40.

19. A porous sintered body according to claim 8, wherein at least a part of said glass has a chemical composition ratio of $B_2O_3/SiO_2$ being 0.01–0.40.

20. A porous sintered body according to claim 9, wherein at least a part of said glass has a chemical composition ratio of $B_2O_3/SiO_2$ being 0.01–0.40.

* * * * *